June 22, 1948.    M. L. FAST    2,443,901
LOCKING MEANS FOR CLUTCH ADJUSTING RINGS
Filed Jan. 31, 1944    2 Sheets-Sheet 1
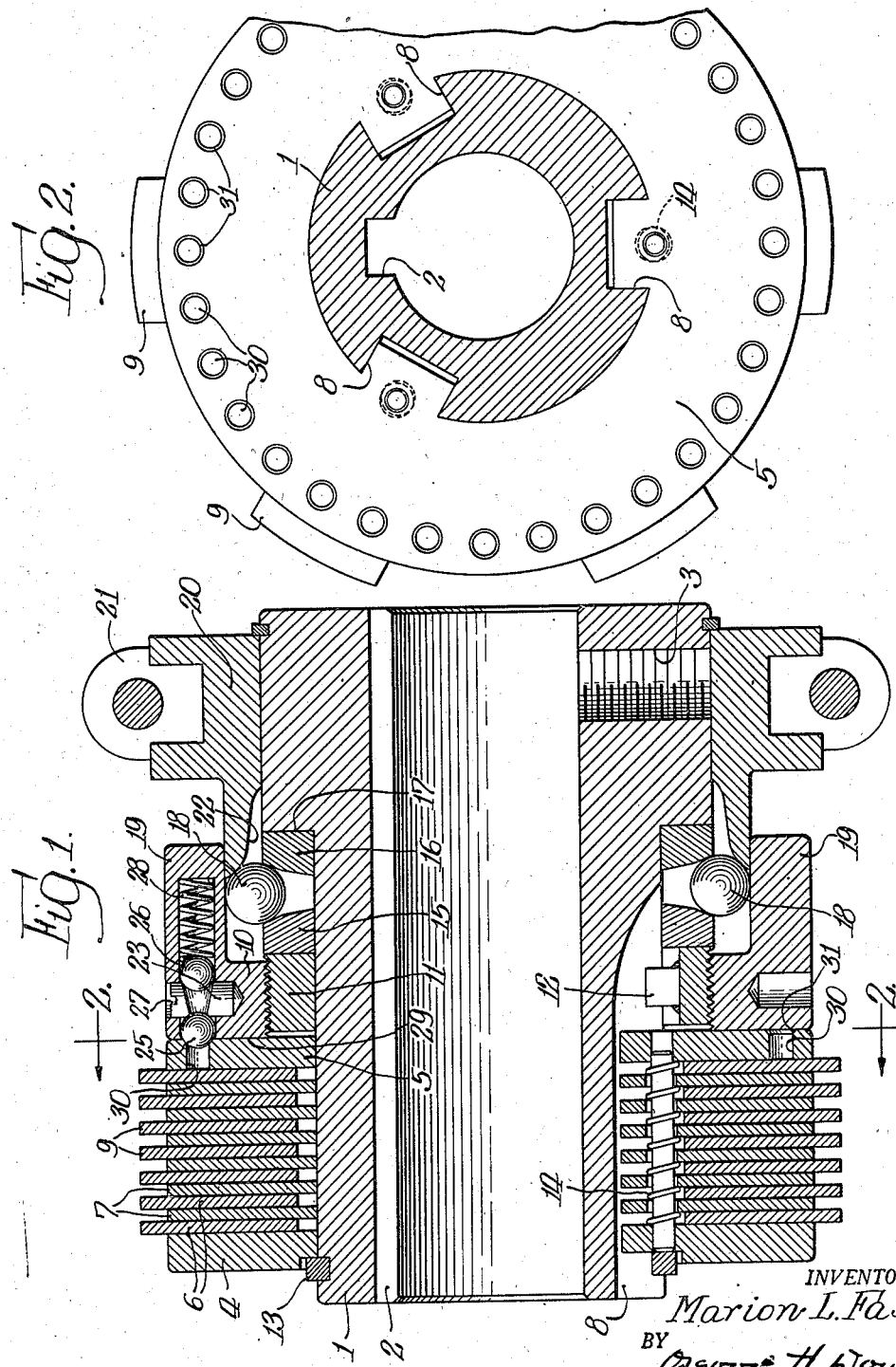
INVENTOR.
Marion L. Fast,
BY Osgood H. Howell
Atty.

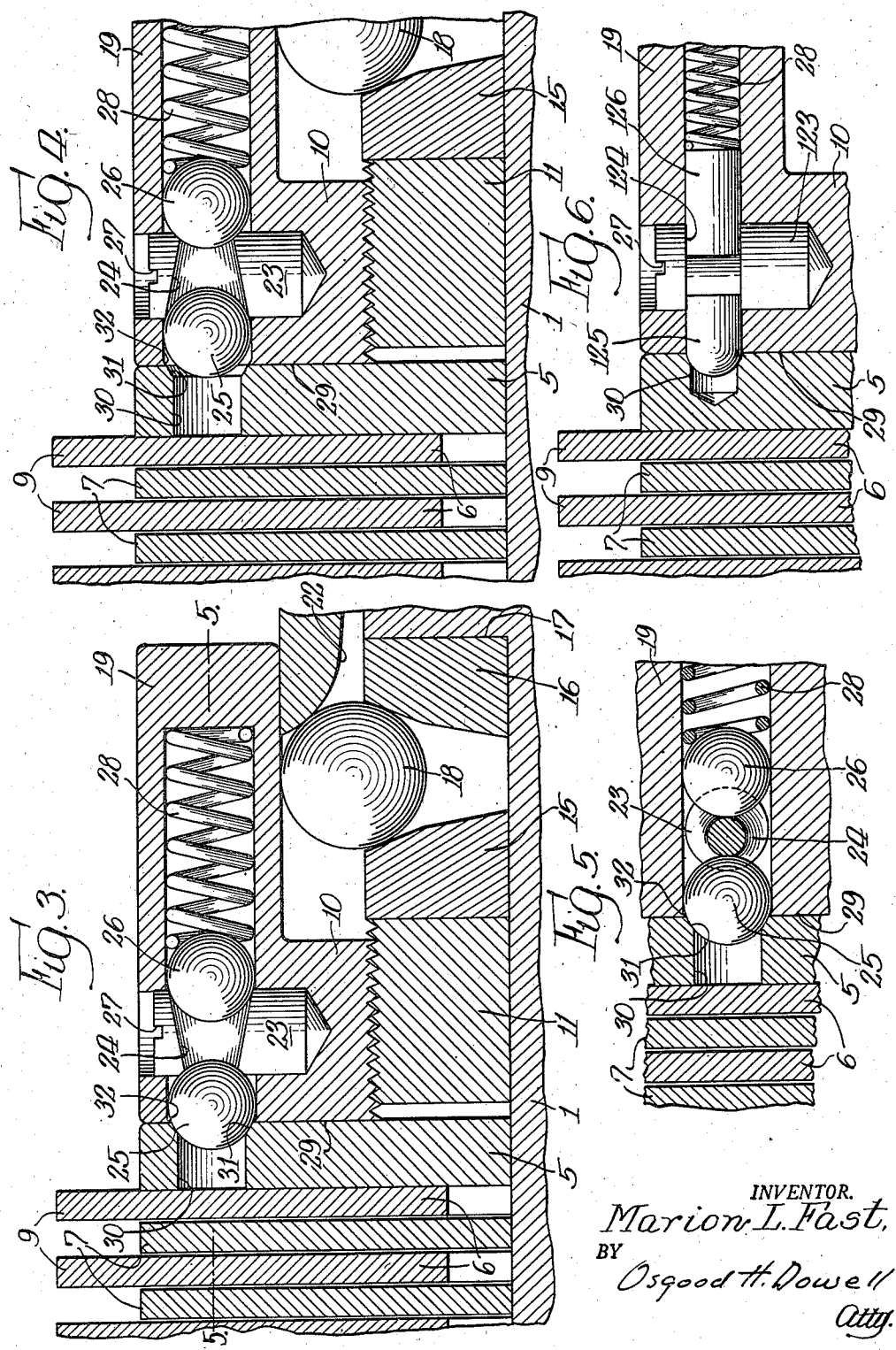

Patented June 22, 1948

2,443,901

UNITED STATES PATENT OFFICE 2,443,901

LOCKING MEANS FOR CLUTCH ADJUSTING RINGS

Marion L. Fast, South Bend, Ind., assignor to Dodge Manufacturing Corporation, Mishawaka, Ind., a corporation of Indiana Application January 31, 1944, Serial No. 520,470

9 Claims. (Cl. 192—111)

My invention aims to provide improved means for locking the adjusting ring of a friction clutch in adjusted angular relation to the member which it abuts and relative to which it is rotatable for adjusting the clutch to compensate for wear of the frictional clutching elements or for establishing a desired axial relationship of members of the clutch.

A friction clutch of one practicable construction containing an embodiment of the invention is shown for illustration in the accompanying drawings, wherein:

Fig. 1 is a longitudinal section of the illustrative clutch, shown in released condition, with the adjusting ring in such angular relation to the clamping plate which it abuts as to reveal the locking means in such section.

Fig. 2 is a cross section on the line 2—2 of Fig. 1, looking in the direction of the arrows.

Fig. 3 is an enlarged portion of Fig. 1 showing the locking means in locking position.

Fig. 4 is a similar view showing the locking means in release position.

Fig. 5 is a section taken through the locking means on the line 5—5 of Fig. 3.

Fig. 6 shows a modified form of locking means.

As represented in the drawings, the hub of the illustrative clutch is constituted by a sleeve 1 which is to be fixed on a shaft in driving connection therewith. The internal keyway 2 in the hub is for engagement by a driving key in engagement with a mating keyway in the shaft. The screw-hole 3 is for a set screw by which to secure the hub against longitudinal movement relative to the shaft. Carried by the hub in driving connection therewith are annular plates 4 and 5 for clamping interposed friction disc means represented in this instance by discs 6 and 7 arranged in alternation. Said clamping plates 4 and 5 and the discs 7 are axially movable but non-rotatable relative to the hub, being slidably fitted thereon and keyed thereto by inwardly extending lugs or key portions of said plates and discs 7 slidably fitted in angularly spaced longitudinal keyways 8 in the hub. The friction discs 6 are adapted to be carried by and in driving connection with a driving bell (not shown) of a pulley or other member which is to be connected by the clutch to the shaft on which the clutch is mounted. Said discs 6 are shown having outwardly projecting lugs 9 for slidably engaging longitudinal keyways in such driving bell.

Abutting the clamping plate 5 is an adjusting ring or nut 10 carried by and in screw-threaded engagement with an axially movable thrust-transmitting member 11 which is slidably fitted on the hub but non-rotatable relative thereto, said member 11 being keyed to the hub by keys 12 rigid with said member and slidably fitted in said keyways 8 of the hub. The other clamping plate 4 abuts an axially fixed thrust shoulder provided in this instance by a snap ring 13 engaging a groove therefor in the hub. When the pressure applied to the plate 5 through the adjusting ring 10 is released, said plate 5 is forced in a direction away from the plate 4 by a plurality of angularly spaced clutch-releasing springs 14, these being compressed coiled springs arranged between the clamping plates, the ends of the springs bearing against said plates. By the pressure of the springs 14, the clamping plate 5 is held in contact with the adjusting ring 10 in the released condition of the clutch.

Fitted freely on the clutch hub behind the member 11 are a pair of thrust rings 15 and 16, one abutting the axially movable thrust-transmitting member 11 and the other abutting a thrust shoulder 17. Said thrust rings 15 and 16 have their confronting faces diverging outwardly and engaged by an annular series of balls 18. In the released condition of the clutch, the force of the springs 14, transmitted through the adjusting ring 10 and its carrying member 11, presses the ring 15 toward the ring 16, thus forcing the balls 18 radially outward, their outward movement being limited in this instance by the tubular flange 19 extending rearwardly from the adjusting ring. Slidably and rotatably fitted on the enlarged rear portion of the clutch hub is a shipper sleeve 20 on which is swiveled a collar 21 which may be connected in a conventional or any suitable manner with a clutch throw lever (not shown) for reciprocating the shipper sleeve. Upon forcing the shipper sleeve forwardly from its retracted position shown in Fig. 1, its internal tapered cam surface 22 coacts with the balls 18 to force them inwardly, spreading the thrust rings 15 and 16, or forcing ring 15 away from ring 16. The force thus exerted on the axially movable member 11 is transmitted through the adjusting ring 10 to the clamping plate 5, forcing it toward the plate 4 to effect clutching by the clamping of the friction discs 6 and 7 between said clamping plates.

It will be understood that the clutch shown and described is but one illustrative example of a clutch organization comprising disc clamping plates and having an adjusting ring abutting one of said plates, said ring being in screw-threaded engagement with a non-rotatable member and the clutch plate which it abuts being axially movable relative to said member and pressed by clutch-releasing springs against said adjusting ring, rotation of which changes the axial relation of said plate and member for adjustment of the clutch to take up wear or otherwise as required for proper functioning.

For releasably locking the adjusting ring 10 in the angular relationship to the clamping plate 5 to which it is adjusted, locking means is provided which in the preferred form shown in Figs. 1 to 5 is described as follows:

Rotatably fitted on a round hole or bore therefor in the adjusting ring is a cylindrical pin 23 having an eccentric annular groove 24 engaged by a pair of balls 25 and 26 of substantially greater diameter than the depth of said groove; said balls being arranged at diametrically opposite sides of said pin and being guided for movement transversely thereof in a bore intersecting and at right angles to the bore for said pin. The head of said pin, which is exposed or accessible through an open end of the bore therefor, is adapted to be engaged by a suitable tool for turning the pin. It is shown provided with a slot 27 for engagement by a screw driver. The hole or bore for said pin 23 may be arranged radially or otherwise so that the axis of the pin lies in a plane parallel with the contacting faces of the adjusting ring 10 and clamping plate 5 which it abuts. The bore for said balls 25 and 26 is parallel with the clutch axis and has an open end in the abutment face 29 of the adjusting ring. The ball 25 which is at the side of the pin adjacent to said face 29 is referred to herein as the fore ball. It functions as a protractible lock bolt operable by lock pin 23 for engaging a keeper hole or recess 30 in the clamping plate 5, said pin thus functioning as bolt-operating means. Said clamping plate has a plurality of such holes 27 arranged in an annular series and selectively registrable with the bore for the balls by rotation of the adjusting ring. Said keeper holes 30 are preferably of substantially smaller diameter than the balls and chamfered at their ends to provide ball seats 31. A spring 28 yieldingly forces the rear ball 26 against the locking pin. This spring-pressed rear ball in frictional engagement with the locking pin serves to prevent accidental turning of the locking pin from locking position. Both balls cooperate with the locking pin to retain it in place so that it cannot fly out by centrifugal force.

In the locking position of the parts shown in Figs. 1, 3 and 5, the fore ball 25 is seated in the shallowest part of the groove 24 and is thus held by the locking pin in a protracted position, protruding a substantial distance, though for less than half of its diameter, beyond the abutment face 29 and into a registered keeper hole 30. As will be observed from Fig. 3, in the locking position of the parts the distance from the axis of the pin 23 to said abutment face 29 is less than the distance from said axis to the foremost extremity of the ball 25 but greater than the distance from said axis to the center of said ball. When the locking pin is turned half way around to the release position shown in Fig. 4, presenting the deepest part of the groove 24 for reception of the ball 23, said ball can recede within the adjusting ring, so as to be disengageable from the keeper hole. For a reason hereinafter indicated preferably the parts are so proportioned that in the releasing position, and with the ball engaging the locking pin in the deepest part of said groove 24, the foremost extremity of the ball still protrudes slightly beyond or forwardly of said abutment face 29.

Assuming the clutch to be in its released condition, and the locking means in the release position shown in Fig. 4, the adjusting ring 10 can be rotated to a desired angular relationship to the clamping plate 5, bringing one of the keeper holes 30 into registration with the bore of the adjusting ring in which the balls work. By turning the locking pin 23 to the locking position shown in Fig. 3, the fore ball is protracted as a lock bolt into engagement with a keeper hole. Accidental turning of the locking pin from locking position is prevented by its frictional engagement with the rear ball 26 forced thereagainst by the spring 28. Since in the locking position of the locking means the rear ball 26 is seated in the deepest part of the groove 24, it will be apparent that under the force of the spring 28 it will hold the pin 23 from turning in either direction; for the pin cannot be turned from its locking position except by forcibly displacing said rear ball 26 against the resistance of said spring.

To unlock the adjusting ring 10, the locking pin 23 is turned by a screw-driver to the release position shown in Fig. 4, thus presenting the deepest part of the groove 24 for reception of the fore ball 23. With the locking means in the release position, the adjusting ring 10 can be turned with the effect of camming the fore ball 25 from its seat 31 into the adjusting ring. As previously mentioned, the parts are preferably so proportioned that in the release position of the locking means the foremost extremity or tip of the fore ball 25 is slightly beyond the plane of the abutment face 29; hence in the rotation of the adjusting ring the ball bears against the back face of the clamping plate 5, being squeezed between said plate and the locking pin, so that it is possible to feel when the ball comes again into registration with one of the keeper holes 30.

In installing the locking means in the adjusting ring 10, the spring 28 and rear ball 26 are first inserted, after which the pin 23 is inserted, displacing the ball until it snaps into engagement with the groove 24. Then the pin is turned to present the deepest part of the groove 24 forwardly, whereupon the fore ball 25 is inserted. The pin is then turned to the locking position shown in Fig. 3, and, while holding the ball 25 seated against the locking pin in the shallowest part of said groove 24, the edge of the metal around the hole through which said ball 25 protrudes is peened over or around said ball, as indicated at 32, so as to retain said ball in the adjusting ring. This prevents disassembly of the lock, since the balls are now permanently retained in the adjusting ring and they retain the pin 23 therein. The locking means having been thus assembled in the adjusting ring 10, the pin 23 is turned to the release position shown in Fig. 4, and, after assembly of the adjusting ring with its carrying member 11 and assembly of the latter and elements 15, 16 and 18 with the clutch hub, the clamping plate 5, friction discs 6 and 7 and clamping plate 1 can be assembled. After assembly of the clutch, the adjusting ring 10 can readily be adjusted to desired position, with the bore for the balls 25 and 26 in registration with one of the keeper holes 30; whereupon the locking pin can be turned to project the fore ball 25 into engagement with such registered keeper hole. There is no opportunity for accidental unlocking, and the adjustment of the adjusting ring can not be changed except deliberately and with the use of a suitable tool for turning the locking pin to release position to permit the change of adjustment.

Although in the illustrative embodiment of the invention shown in Figs. 1 to 5 the locking means is contained in the adjusting ring and the keeper holes 30 are provided in the clamping plate which the adjusting ring abuts, it will be understood that this arrangement may be reversed, or in other words the locking means may be contained in the clamping plate and the keeper holes may be provided in the adjusting ring. Such a reversal of arrangement would of course require the employment of a clamping plate of appropriate thickness or longitudinal dimension to accommodate the locking means.

Within the scope of the invention, slidable pins may be employed in lieu of the balls 25 and 26, as for example in the modified construction shown in Fig. 6 wherein the locking pin designated 123 has an eccentric annular groove 124 engaged by pins 125 and 126 arranged at opposite sides of the locking pin and slidably fitted in the bore therefor, the fore pin 125 (corresponding to the ball 25) being protractible for engaging a keeper hole 30 and the rear pin 126 being pressed by the spring 28 into frictional engagement with the locking pin. As shown the fore pin 125 has a rounded fore end which cooperates with the keeper holes 30 in the same manner as the ball 25 in the preceding figures.

The clutch operator shown and described but not claimed herein is claimed in my co-pending application 520,469, filed January 31, 1944, now Patent 2,397,414.

I claim:

1. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising in one of said members a rotatable pin and an element movable transversely thereof and operable by turning the pin to one position to protrude through an opening in the abutment face of said one of said members, said pin in said position holding said element so protracted, there being in the other of said members an annular series of keeper holes selectively registrable with said opening and engageable by said element, the portion of said pin coactive with said element being so formed that by turning the pin to another position said element can recede to a release position, and a spring pressed element frictionally engaging said pin to hold it from accidental turning from locking position, said keeper holes having seats therein engageable by said element and coactive therewith for camming it out of its keeper hole by turning the ring while said pin is in release position.

2. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising in one of said members a rotatable pin having an eccentric annular groove and a pair of elements engaging said groove at opposite sides of said pin and movable transversely thereof in a bore therefor intersecting a bore for said pin and having an open end in the abutment face of said one of said members, there being in the other of said members an annular series of keeper holes selectively registrable with said bore, one of said elements being protrudable into a registered keeper hole by turning the pin to a position for engaging said one in the shallowest part of said groove and the other element being yieldingly held in frictional engagement with the pin, the turning of the pin to position to receive said one of the elements in the deepest part of said groove allowing release of the locking means, said keeper holes having seats therein engageable by said one of said elements and coactive therewith for camming it out of its keeper hole by rotation of the ring while said pin is in release position.

3. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising in one of said members a radially disposed rotatable pin having an accentric annular groove and a pair of elements engaging said groove at opposite sides of said pin and movable transversely thereof in a bore therefor parallel with the clutch axis and having an open end in the abutment face of said one of said members, there being in the other of said members an annular series of keeper holes selectively registrable with said bore, the fore one of said elements being protractible into engagement with a registered keeper hole by turning the pin to engage said element in the shallowest part of said groove and releaseable from such engagement when received in the deepest part of said groove, and the rear one of said elements being yieldingly held in frictional engagement with said pin, said keeper holes having seats therein engageable by said fore element and coactive therewith for camming it out of its keeper hole by turning the ring while said pin is in release position.

4. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising a cylindrical pin rotatably fitted in a bore therefor in one of said members which has also a second bore intersecting and at right angles to the first and normal to and with an open end in the abutment face of said one of said members, there being in the other of said members an annular series of keeper holes selectively registrable with said second bore, a pair of balls arranged at opposite sides of said pin and movable transversely thereof in said second bore, said pin having an eccentric annular groove engaged by said balls, one of said balls being operable by said pin to engage a registered keeper hole and releasable from such engagement when the pin is in a position to receive said one in the deepest part of said groove, and means yieldingly pressing the other ball into frictional engagement with said pin, said keeper holes having seats therein engageable by said fore ball and coactable therewith for camming it out of its keeper hole by turning the ring while said pin is in release position.

5. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising a cylindrical pin rotatably fitted in a bore therefor in one of said members which has also a second bore intersecting and at right angles to the first and normal to and with an open end in the abutment face of one of said members, there being in the other of said members an annular series of keeper recesses selectively registrable with said second bore, a pair of slidable pins arranged at opposite sides of said rotatable pin and slidably fitted in said second bore, said rotatable pin having an eccentric annular groove engaged by said slidable pins, one of said slidable pins being operable by said rotatable pin to protrude into engagement with a registered keeper recess and releasable from engagement with such recess when the rotatable pin is in position to receive said one in the deepest part of said groove, and the other slidable pin being spring pressed into frictional engagement with said rotatable pin, said keeper recesses having seats therein engageable by said fore slidable pin and coactive therewith for camming it out of its keeper hole by turning the ring while said rotatable pin is in release position.

6. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising in one of said members a lock bolt protractible through an opening in the abutment face of said one, means in said one operable for protracting said bolt, said means in one position holding the bolt protracted and in another position allowing recession thereof, means yieldingly resisting movement of said bolt-operating means from position to hold the bolt protracted, said bolt when fully receded protruding beyond said face, and in the other of said members an annular series of keeper holes selectively registrable with said opening and forming bolt-engaging seats therein, the bolt being protractible into engagement with such a seat by moving said bolt-operating means to its first mentioned position, said seats and bolt being formed for camming coaction whereby to force the bolt out of its keeper hole by turning the adjusting member while the bolt-operating means is in release position, the bolt being pressed against the abutment face of said other as the ring is turned to move the bolt from one keeper hole to the next.

7. In a friction clutch having a rotatable adjusting member and a member spring-held in abutting relation thereto and relative to which the adjusting member is rotatable and wherein said members have contacting annular abutment faces, a locking means for maintaining the adjusting member in adjusted angular relation to the abutting member comprising in one of said members a pin bore drilled from its periphery parallel with its abutment face and an intersecting bore drilled from said face parallel with the clutch axis, a cylindrical pin rotatably fitted in said pin bore and having an eccentric annular groove in line with said intersecting bore, a pair of elements slidably fitted in said intersecting bore and engaging in said groove at opposite sides of the pin axis, the fore one of said elements being projectible as a lock bolt, a spring forcing the rear one of said elements into frictional engagement with the pin, and in the other of said members an annular series of keeper holes selectively registrable with said intersecting bore and forming seats therein for said fore element, the latter being protractible into engagement with such a seat by turning said pin to position to engage said fore element in the shallowest part of said groove, the pin when turned to a release position allowing recession of said fore element into the deepest part of said groove, said fore element when fully receded protruding beyond said abutment face, and said seats and fore element being formed for camming coaction whereby to force said fore element out of its keeper hole by turning the adjusting member while the pin is in release position, said fore element bearing against the abutment face of said other as the adjusting member is rotated to move said fore element from one keeper hole to the next.

8. In a friction clutch having disc-clamping plates and an adjusting nut abutting one of them in the applied and released conditions of the clutch and by rotation of which relative thereto the axial relation of said plates is adjusted, a locking means for maintaining said nut in adjusted angular relation to the abutting plate comprising a lock bolt in said nut protractible through an opening in the face thereof contacting with said abutting plate, means in said nut operable for protracting said bolt, said means in one position holding the bolt protracted and in another position allowing recession thereof, means yieldingly resisting movement of said bolt-operating means from position to hold the bolt protracted, said bolt when fully receded protruding beyond said face, and in said abutting plate an annular series of keeper recesses forming bolt engageable seats selectively registrable with said opening, the bolt being protractible into engagement with such a seat by moving said bolt-operating means to its first mentioned position, said seats and bolt being formed for camming coaction whereby to force the bolt out of its keeper recess by turning the nut while the bolt-operating means is in release position, the bolt being pressed against said abutting plate as the nut is turned to move the bolt from one keeper recess to the next.

9. In a friction clutch having disc-clamping plates and an adjusting nut abutting one of them in the applied and released conditions of the clutch and by rotation of which relative thereto the axial relation of said plates is adjusted, a locking means for maintaining said nut in adjusted angular relation to the abutting plate comprising a rotatable pin in said nut disposed transversely of its axis, said nut having a bore for said pin with an open end in the periphery of the nut and an intersecting bore with an open end in the nut face contacting with said abutting plate, said pin having an eccentric annular groove in line with said intersecting bore, a pair of elements slidably fitted in said intersecting bore and engaging in said groove at opposite sides of the pin axis, the fore one of said elements being protractible from said face, a spring forcing the rear one of said elements into frictional engagement with the pin, and in said abutting plate an annular series of keeper recesses selectively registrable with said intersecting bore and forming seats for said fore element, the latter being protractible into engagement with such a seat by turning said pin to position to engage said fore element in the shallowest part of said groove, the pin when turned to a release position allowing recession of said fore element into the deepest part of said groove, said fore element when fully receded protruding beyond said face, and said seats and fore element being formed for camming coaction whereby to force said fore element out of its keeper recess by turning said nut while the pin is in release position.

MARION L. FAST.

REFERENCES CITED

The following references are of record in the file of this patent:

UNITED STATES PATENTS

| Number | Name | Date |
| --- | --- | --- |
| 572,460 | Van Derveer | Dec. 1, 1896 |
| 995,058 | Curry | June 13, 1911 |
| 1,032,889 | Freund | July 16, 1912 |
| 1,964,479 | Pearmain | June 26, 1934 |
| 2,070,149 | Turner | Feb. 9, 1937 |
| 2,140,619 | Dunkelow | Dec. 20, 1938 |